US011483557B2

(12) United States Patent
Du et al.

(10) Patent No.: US 11,483,557 B2
(45) Date of Patent: Oct. 25, 2022

(54) SEPARATE CONSTRAINED DIRECTIONAL ENHANCEMENT FILTER

(71) Applicant: TENCENT AMERICA LLC, Palo Alto, CA (US)

(72) Inventors: Yixin Du, Los Altos, CA (US); Liang Zhao, Sunnyvale, CA (US); Xin Zhao, San Diego, CA (US); Shan Liu, San Diego, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/091,759

(22) Filed: Nov. 6, 2020

(65) Prior Publication Data
US 2021/0400266 A1  Dec. 23, 2021

Related U.S. Application Data

(60) Provisional application No. 63/040,856, filed on Jun. 18, 2020.

(51) Int. Cl.
H04N 19/44 (2014.01)
H04N 19/176 (2014.01)
H04N 19/186 (2014.01)
H04N 19/117 (2014.01)
H04N 19/139 (2014.01)

(52) U.S. Cl.
CPC ......... H04N 19/117 (2014.11); H04N 19/139 (2014.11); H04N 19/176 (2014.11); H04N 19/186 (2014.11); H04N 19/44 (2014.11)

(58) Field of Classification Search
CPC .................................................. H04N 19/117
See application file for complete search history.

(56) References Cited

U.S. PATENT DOCUMENTS

| 7,437,013 | B2 * | 10/2008 | Anderson | ............... G06T 5/002 358/463 |
| 7,565,020 | B2 * | 7/2009 | Wu | ........................ H04N 19/19 382/238 |
| 10,652,535 | B1 * | 5/2020 | Chen | ........................ G06T 1/60 |

(Continued)

OTHER PUBLICATIONS

Benjamin Bross, "Versatile Video Coding (Draft 7)", Joint Video Experts Team (JVET) of ITU-T SG 16 WP 3 and ISO/IEC JTC 1/SC 29/WG 11, JVET-P2001-vE, Oct. 1-11, 2019, pp. 1-489, 16th Meeting, Geneva, CH.

(Continued)

Primary Examiner — Irfan Habib
(74) Attorney, Agent, or Firm — Sughrue Mion, PLLC

(57) ABSTRACT

A method, a non-transitory computer readable medium, and a computer system is provided for encoding or decoding video data. The method may include: receiving video data comprising a chroma component and a luma component; parsing, deriving or selecting a number of presets for the chroma component in one frame, and a number of presets for the luma component in the one frame; and decoding the video data. The method may further comprise: performing a separate Constrained Directional Enhancement Filter (CDEF) process of filtering luma and chroma components independent from each other based on the number of presets for the chroma component in one frame, and the number of presets for the luma component in the one frame.

16 Claims, 17 Drawing Sheets

(56) References Cited

U.S. PATENT DOCUMENTS

| | | | | |
|---|---|---|---|---|
| 11,303,936 | B2* | 4/2022 | Du | H04N 19/46 |
| 2019/0045186 | A1* | 2/2019 | Zhang | H04N 19/172 |
| 2019/0052877 | A1* | 2/2019 | Zhang | H04N 19/124 |
| 2019/0052911 | A1* | 2/2019 | Zhang | H04N 19/82 |
| 2020/0314452 | A1* | 10/2020 | Zhang | H04N 19/117 |
| 2021/0329261 | A1* | 10/2021 | Ma | H04N 19/186 |

OTHER PUBLICATIONS

K. Misra et al., "CE5-related: On the design of CC-ALF", Joint Video Experts Team (JVET) of ITU-T SG 16 WP 3 and ISO/IEC JTC 1/SC 29/WG 11, JVET-P1008-v2, Oct. 1-11, 2019, pp. 1-6, 16th Meeting, Geneva, CH.

Kiran Misra et al., "Cross-Component Adaptive Loop Filter for chroma", Joint Video Experts Team (JVET) of ITU-T SG 16 WP 3 and ISO/IEC JTC 1/SC 29/WG 11, JVET-O0636_r1, Jul. 3-12, 2019, pp. 1-9, 15th Meeting, Gothenburg, SE.

Jonathan Taquet et al., "CE5: Results of tests CE5-3.1 to CE5-3.4 on Non-Linear Adaptive Loop Filter", Joint Video Experts Team (JVET) of ITU-T SG 16 WP 3 and ISO/IEC JTC 1/SC 29/WG 11, JVET-N0242, Mar. 19-27, 2019, pp. 1-10, 14th Meeting, Geneva, CH.

Chia-Yang Tsai et al., "TE10 Subtest2: Coding Unit Synchronous Picture Quadtree-based Adaptive Loop Filter", Joint Collaborative Team on Video Coding (JCT-VC) of ITU-T SG16 WP3 and ISO/IEC JTC1/SC29/WG11, JCTVC-C143, Oct. 7-15, 2010, pp. 1-12, 3rd Meeting, Guangzhou, CN.

Thomas J. Daede et al., "Daala: A Perceptually-Driven Next Generation Video Codec", arXiv:1603.03129v1 [cs.MM] Mar. 10, 2016, pp. 1-10.

Benjamin Bross, "Versatile Video Coding (Draft 6)", Joint Video Experts Team (JVET) of ITU-T SG 16 WP 3 and ISO/IEC JTC 1/SC 29/WG 11, JVET-O2001-vE, Jul. 3-12, 2019, pp. 1-460, 15th Meeting, Gothenburg, SE.

John Canny, "A Computational Approach to Edge Detection", IEEE Transactions on Pattern Analysis and Machine Intelligence, Nov. 1986, pp. 679-698, vol. PAMI-8, No. 6.

Debargha Mukherjee et al., "A Switchable Loop-Restoration With Side-Information Framework for the Emerging AV1 Video Codec", ICIP 2017, pp. 265-269.

Steinar Midtskogen et al., "The AV1 Constrained Directional Enhancement Filter (CDEF)", arXiv:1602.05975v3 [cs.MM] Oct. 28, 2017, pp. 1-5.

International Search Report dated Apr. 15, 2021 from the International Searching Authority in International Application No. PCT/US 21/16202.

Written Opinion dated Apr. 15, 2021 from the International Bureau in International Application No. PCT/US 21/16202.

* cited by examiner

ALF Filter Shapes
(chroma: 5x5 diamond,
luma: 7x7 diamond)

Subsampled positions for vertical gradient

Subsampled positions for horizontal gradient

FIG. 3B

Subsampled positions for diagonal gradient

FIG. 3C

Subsampled positions for diagonal gradient

Modified Block Classification At Virtual Boundaries

Modified ALF filtering for Luma component at virtual boundaries

Location of chroma samples relative to luma samples

Example of direction search for an 8×8 block.

Example of direction search for an 8×8 block.

Coding tree structure for chroma component

Coding tree structure for luma component

Example of coding tree structures (luma and chroma)

Separate Constrained Directional Enhancement Filter (SCDEF)

SEPARATE CONSTRAINED DIRECTIONAL ENHANCEMENT FILTER

PRIORITY INFORMATION

This application claims the benefit of priority from U.S. Provisional Application No. 63/040,856 filed Jun. 18, 2020, which is hereby incorporated by reference in its entirety.

FIELD

The disclosure relates generally to the field of data processing, and more particularly to video encoding and/or decoding (e.g., by a coder, a decoder or a codec (decoder and encoder)).

BACKGROUND

AOMedia Video 1 (AV1) is an open video coding format designed for video transmissions over the Internet. It was developed as a successor to, for example, codec extensions in the related art.

SUMMARY

Embodiments relate to a method, system, and computer readable medium for encoding and/or decoding video data. According to one aspect, a method for encoding and/or decoding video data is provided. The method may include receiving video data comprising a chroma component and a luma component; parsing, deriving or selecting a number of presets for the chroma component in one frame, and a number of presets for the luma component in the one frame; and decoding the video data, wherein the method comprises performing a separate Constrained Directional Enhancement Filter (CDEF) process of filtering luma and chroma components independent from each other based on the number of presets for the chroma component in one frame, and the number of presets for the luma component in the one frame.

The method may include, when luma and chroma components have different partitioning or semi-decoupled partitioning, perform the separate Constrained Directional Enhancement Filter (CDEF) process of filtering luma and chroma components independent from each other; and obtaining an output of the separate CDEF process that includes the filtered reconstructed samples of luma/chroma components, wherein an input of the separate CDEF process is reconstructed samples of luma/chroma components, an intermediate output of the separate CDEF process includes using the derived filter presets and a per-block level preset index.

The number of presets derived for the luma component is different from the number of presets derived for the chroma component at picture level.

The number of presets at picture level may include one of: 1, 2, 4, or 8.

The number of presets derived and selected for the luma component in the one frame is 2, and the number of presets derived and selected for the chroma component in the one frame is 1.

The number of presets derived and selected for luma component is N, which is a positive integer, and the number of presets for chroma component is fixed as 1, which is derived as 1 in the decoder without signaling.

The selected preset index for the current luma block is different from a selected preset index for the current chroma block, and an input of the separate CDEF process is luma/chroma reconstructed samples of current block, and the presets derived and selected at frame level. The output of this process is an index indicating which preset is selected for current block.

The method may further comprise: when the number of the luma components corresponds to 8 presets and the number of the chroma component corresponds to 4 presets at frame level, select the preset index for a luma block A as 7, and the preset index for a chroma block B as 1, wherein the luma block A and the chroma block B are co-located or partially co-located.

The method may further comprise: when deriving a CDEF filtering strength of the chroma component, an input reconstructed sample is determined by current chroma coded block size.

The method may further comprise: when current chroma block is of a certain size, an input is chroma reconstructed sample values of a current block having the certain size.

The method may further comprise: when separate partitioning or semi de-coupled partitioning is applied to the luma and chroma blocks, luma and chroma blocks still share the same preset index, and only one of the luma or chroma block size is employed in the preset index derivation/signaling process.

The method may further comprise: when luma and chroma components have the same coded block size, the CDEF filtering process of luma and chroma components are performed separately.

The picture level presets may be signaled separately for luma and chroma components in a high-level parameter set, slice header, picture header, or a Supplementary Enhancement Information (SEI) message.

The luma presets may be signaled first, then, chroma presets are signaled.

The block level preset indexes are signaled separately for luma and chroma components.

The preset indexes of luma component are signaled first, then, preset indexes of chroma component are signaled.

A computer system for decoding video data may comprise: one or more computer-readable non-transitory storage media configured to store computer program code; and one or more computer processors configured to access said computer program code and operate as instructed by said computer program code, said computer program code including: receiving code configured to cause the one or more computer processors to receive video data comprising a chroma component and a luma component; parsing, deriving or selecting code configured to cause the one or more computer processors to parse, derive or select a number of presets for the chroma component in one frame, and a number of presets for the luma component in the one frame; and decoding code configured to cause the one or more computer processors to decode the video data, wherein the method comprises performing a separate Constrained Directional Enhancement Filter (CDEF) process of filtering luma and chroma components independent from each other based on the number of presets for the chroma component in one frame, and the number of presets for the luma component in the one frame.

A non-transitory computer readable medium having stored thereon a computer program for decoding video data may be configured to cause one or more computer processors to: receive video data comprising a chroma component and a luma component; parse, derive or select code configured to cause the one or more computer processors to parse, derive or select a number of presets for the chroma component in one frame, and a number of presets for the luma component in the one frame; and decode code configured to cause the one or more computer processors to decode the video data, wherein the method comprises performing a separate Constrained Directional Enhancement Filter (CDEF) process of filtering luma and chroma components independent from each other based on the number of presets for the chroma component in one frame, and the number of presets for the luma component in the one frame.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings:

FIGS. 3A-3D illustrates subsampled positions for diagonal gradients;

DETAILED DESCRIPTION

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of data processing, and more particularly to video encoding and/or decoding. The following described exemplary embodiments provide a system, method and computer program to, among other things, encode and/or decode video data.

As previously described, AOMedia Video 1 (AV1) is an open video coding format designed for video transmissions over the Internet. It was developed as a successor to VP9 by the Alliance for Open Media (AOMedia), a consortium founded in 2015 that includes semiconductor firms, video on demand providers, video content producers, software development companies and web browser vendors.

Aspects are described herein with reference to flowchart illustrations and/or block diagrams of methods, apparatus (systems), and computer readable media according to the various embodiments. It will be understood that each block of the flowchart illustrations and/or block diagrams, and combinations of blocks in the flowchart illustrations and/or block diagrams, can be implemented by computer readable program instructions.

Figure 1:
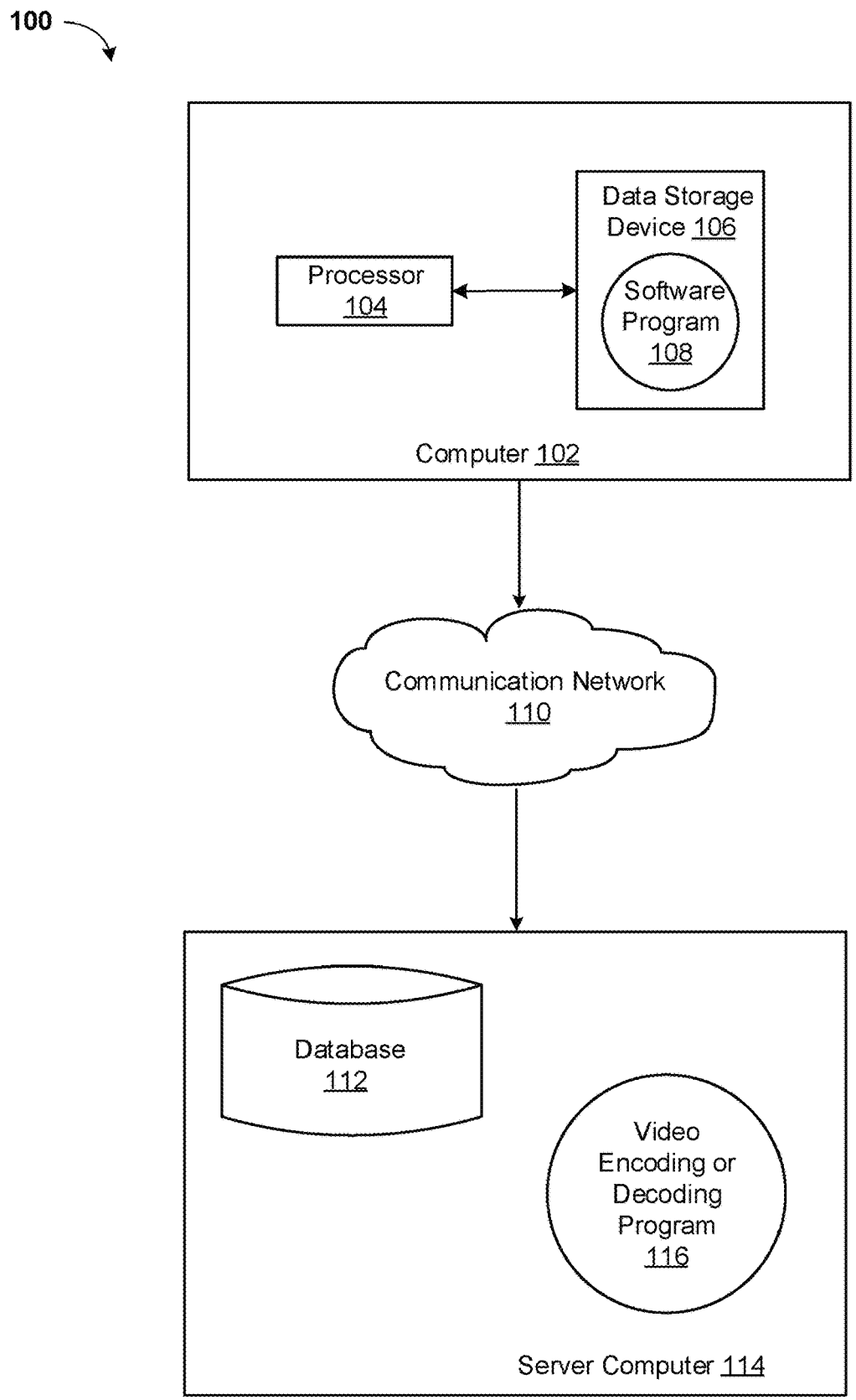
FIG. 1 illustrates a networked computer environment according to at least one embodiment.

Referring now to FIG. 1, a functional block diagram of a networked computer environment illustrating a video coding system 100 (hereinafter "system") for encoding and/or decoding video data according to an embodiment. It should be appreciated that FIG. 1 provides only an illustration of one implementation and does not imply any limitations with regard to the environments in which different embodiments may be implemented. Many modifications to the depicted environments may be made based on design and implementation requirements.

The system 100 may include a computer 102 and a server computer 114. The computer 102 may communicate with the server computer 114 via a communication network 110 (hereinafter "network"). The computer 102 may include a processor 104 and a software program 108 that is stored on a data storage device 106 and is enabled to interface with a user and communicate with the server computer 114. As will be discussed below with reference to FIG. 12 the computer 102 may include internal components 800A and external components 900A, respectively, and the server computer 114 may include internal components 800B and external components 900B, respectively. The computer 102 may be, for example, a mobile device, a telephone, a personal digital assistant, a netbook, a laptop computer, a tablet computer, a desktop computer, or any type of computing devices capable of running a program, accessing a network, and accessing a database.

The server computer 114 may also operate in a cloud computing service model, such as Software as a Service (SaaS), Platform as a Service (PaaS), or Infrastructure as a Service (IaaS), as discussed below with respect to FIGS. 13 and 14. The server computer 114 may also be located in a cloud computing deployment model, such as a private cloud, community cloud, public cloud, or hybrid cloud.

The server computer 114, which may be used for encoding video data is enabled to run a Video Encoding or Decoding Program 116 (hereinafter "program") that may interact with a database 112. The Video Encoding or Decoding Program method is explained in more detail below with respect to FIG. 3. In one embodiment, the computer 102 may operate as an input device including a user interface while the program 116 may run primarily on server computer 114. In an alternative embodiment, the program 116 may run primarily on one or more computers 102 while the server computer 114 may be used for processing and storage of data used by the program 116. It should be noted that the program 116 may be a standalone program or may be integrated into a larger video encoding program. The Video Encoding or Decoding Program 116 may be corresponding to an encoder, a decoder, or a coded (both encoder and decoder).

It should be noted, however, that processing for the program 116 may, in some instances be shared amongst the computers 102 and the server computers 114 in any ratio. In another embodiment, the program 116 may operate on more than one computer, server computer, or some combination of computers and server computers, for example, a plurality of computers 102 communicating across the network 110 with a single server computer 114. In another embodiment, for example, the program 116 may operate on a plurality of server computers 114 communicating across the network 110 with a plurality of client computers. Alternatively, the program may operate on a network server communicating across the network with a server and a plurality of client computers.

The network 110 may include wired connections, wireless connections, fiber optic connections, or some combination thereof. In general, the network 110 can be any combination of connections and protocols that will support communications between the computer 102 and the server computer 114. The network 110 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a metropolitan area network (MAN), a private network, an ad hoc network, an intranet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of system 100 may perform one or more functions described as being performed by another set of devices of system 100.

1 Adaptive Loop Filter (ALF)

In Versatile Video Coding (VVC) (Draft 8), an Adaptive Loop Filter (ALF) with block-based filter adaption is applied. For the luma component, one among 25 filters is selected for each 4×4 block, based on the direction and activity of local gradients.

1.1 Filter Shape

Figure 2:
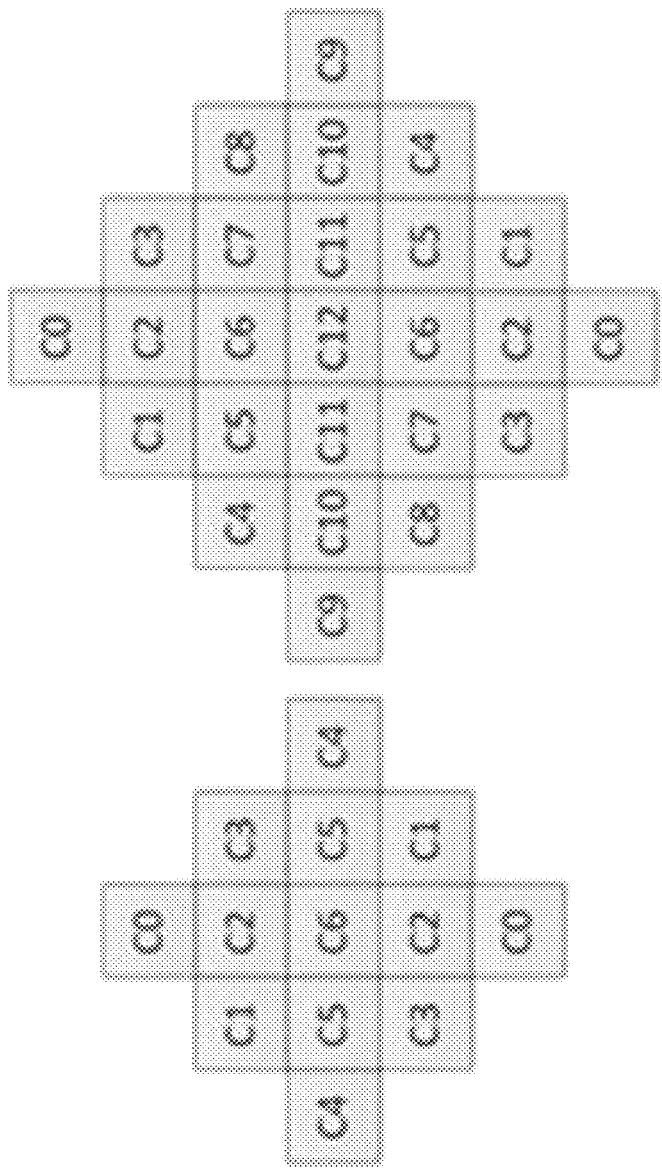
FIG. 2 illustrates adaptive loop filter (ALF) filter shapes.

In VVC (Draft 8), two diamond filter shapes (as shown in FIG. 2) may be used. The 7×7 diamond shape is applied for luma component and the 5×5 diamond shape is applied for chroma components.

1.2 Block Classification

For luma component, each 4×4 block is categorized into one out of 25 classes. The classification index C is derived based on its directionality D and a quantized value of activity A, as follows:

$$C=5D+\hat{A} \quad \text{(Eq. 1)}$$

To calculate D and $\hat{A}$, gradients of the horizontal, vertical and two diagonal direction are first calculated using 1-D Laplacian:

$$g_v = \Sigma_{k=i-2}^{i+3} \Sigma_{l=j-2}^{j+3} V_{k,l}, V_{k,l} = |2R(k,l) - R(k,l-1) - R(k,l+1)| \quad \text{(Eq. 2)}$$

$$g_h = \Sigma_{k=i-2}^{i+3} \Sigma_{l=j-2}^{j+3} H_{k,l}, H_{k,l} = |2R(k,l) - R(k-1,l) - R(k+1,l)| \quad \text{(Eq. 3)}$$

$$g_{d1} = \Sigma_{k=i-2}^{i+3} \Sigma_{l=j-2}^{j+3} D1_{k,l}, D1_{k,l} = |2R(k,l) - R(k-1,l-1) - R(k+1,l+1)| \quad \text{(Eq. 4)}$$

$$g_{d2} = \Sigma_{k=i-2}^{i+3} \Sigma_{j=j-2}^{j+3} D1_{k,l}, D1_{k,l} = |2R(k,l) - R(k-1,l-1) - R(k+1,l+1)| \quad \text{(Eq. 5)}$$

Where indices i and j refer to the coordinates of the upper left sample within the 4×4 block and R(i,j) indicates a reconstructed sample at coordinate (i,j).

Figure 3A:
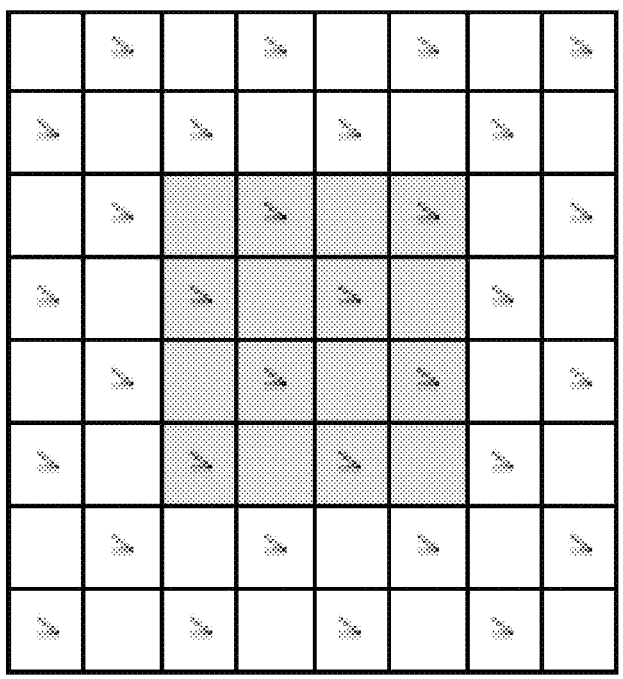
Figure 3B:
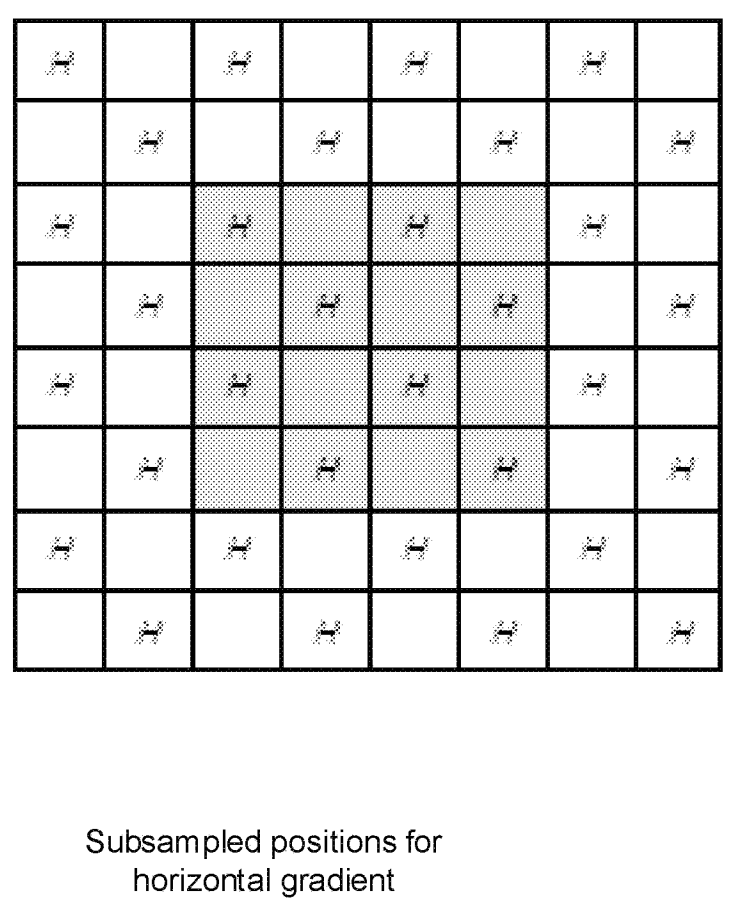
Figure 3C:
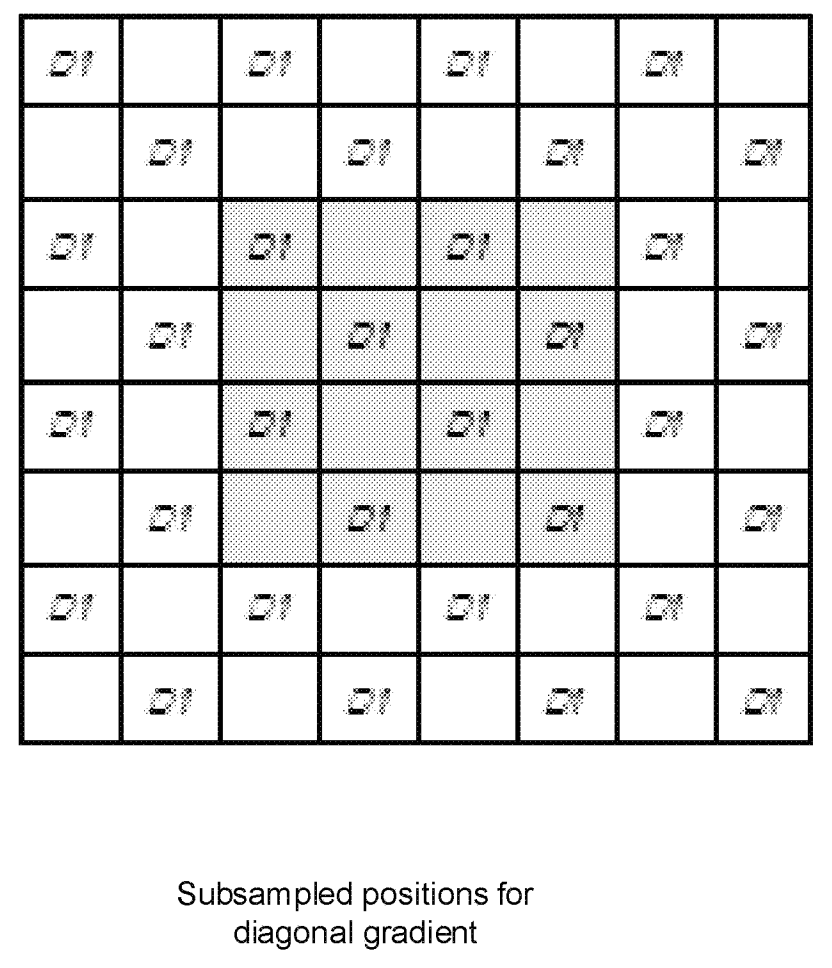
Figure 3D:
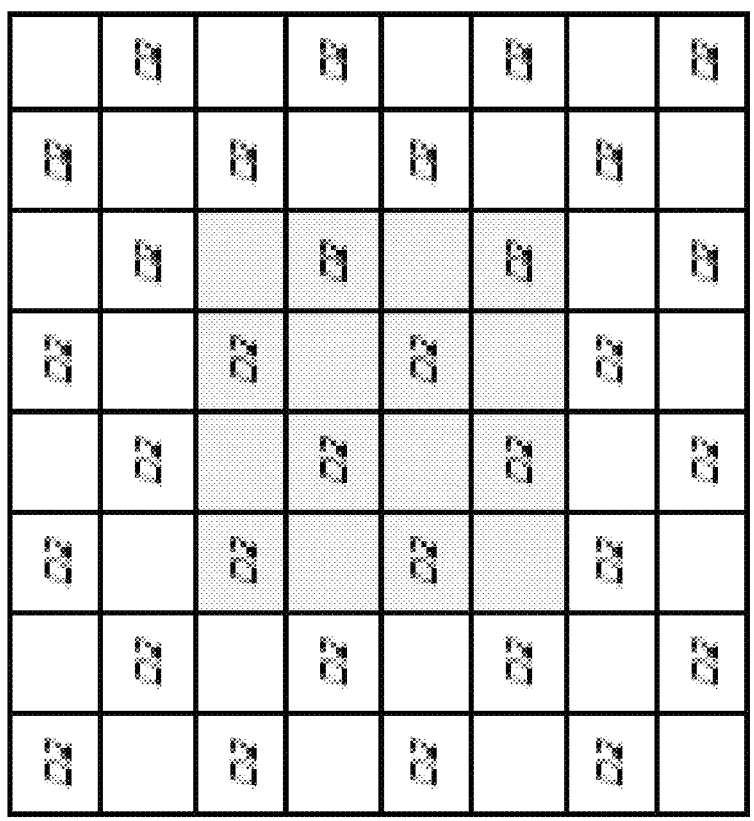

To reduce the complexity of block classification, the subsampled 1-D Laplacian calculation is applied. As shown in FIGS. 3A-3D, the same subsampled positions are used for gradient calculation of all directions (e.g., a subsampled Laplacian calculation for all directions). For example, FIG. 3A shows subsampled positions for vertical gradient, FIG. 3B shows subsampled positions for horizontal gradient, and FIGS. 3C and 3D show subsampled portions for diagonal gradients.

Then D maximum and minimum values of the gradients of horizontal and vertical directions are set as:

$$g_{h,v}^{max} = \max(g_h, g_v), g_{h,v}^{min} = \min(g_h, g_v) \quad \text{(Eq. 6)}$$

The maximum and minimum values of the gradient of two diagonal directions are set as:

$$g_{d1,d2}^{max} = \max(g_{d1}, g_{d2}), g_{d1,d2}^{min} = \min(g_{d1}, g_{d2}) \quad \text{(Eq. 7)}$$

To derive the value of the directionality D, these values are compared against each other and with two thresholds $t_1$ and $t_2$:

Step 1. If both $g_{h,v}^{max} \le t_1 \cdot g_{h,v}^{min}$ and $g_{d1,d2}^{max} \le t_1 \cdot g_{d1,d2}^{min}$ are true, D is set to 0.

Step 2. If $g_{h,v}^{max}/g_{h,v}^{min} > g_{d1,d2}^{max}/g_{d1,d2}^{min}$, continue from Step 3; otherwise continue from Step 4.

Step 3. If $g_{h,v}^{max} > t_2 \cdot g_{h,v}^{min}$, D is set to 2; otherwise D is set to 1.

Step 4. If $g_{d1,d2}^{max} > t_2 \cdot g_{d1,d2}^{min}$, D is set to 4; otherwise D is set to 3.

The activity value A is calculated as:

$$A = \Sigma_{k=i-2}^{i+3} \Sigma_{l=j-2}^{j+3} (V_{k,l} + H_{k,l}) \quad \text{(Eq. 8)}$$

A is further quantized to the range of 0 to 4, inclusively, and the quantized value is denoted as $\hat{A}$.

For chroma components in a picture, no classification method is applied, i.e. a single set of ALF coefficients is applied for each chroma component.

1.3 Geometric Transformations of Filter Coefficients and Clipping Values

Before filtering each 4×4 luma block, geometric transformations such as rotation or diagonal and vertical flipping are applied to the filter coefficients f(k,l) and to the corresponding filter clipping values c(k,l) depending on gradient values calculated for that block. This is equivalent to applying these transformations to the samples in the filter support region. The idea is to make different blocks to which ALF is applied more similar by aligning their directionality.

Three geometric transformations, including diagonal, vertical flip and rotation are introduced:

$$\text{Diagonal:} f_D(k,l) = f(l,k), c_D(k,l) = (l,k), \quad \text{(Eq. 9)}$$

$$\text{Vertical flip:} f_V(k,l) = f(k,K-l-1), c_V(k,l) = c(k,K-l-1) \quad \text{(Eq. 10)}$$

$$\text{Rotation:} f_R(k,l) = f(K-l-1,k), c_R(k,l) = c(K-l-1,k) \quad \text{(Eq. 11)}$$

where K is the size of the filter and $0 \leq k, l \leq K-1$ are coefficients coordinates, such that location (0,0) is at the upper left corner and location (K−1, K−1) is at the lower right corner. The transformations are applied to the filter coefficients f(k,l) and to the clipping values c(k,l) depending on gradient values calculated for that block. The relationship between the transformation and the four gradients of the four directions are summarized in the following Table 1.

TABLE 1

Mapping of the gradient calculated for one block and the transformations

| Gradient values | Transformation |
|---|---|
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

1.4 Filter Parameters Signalling

In VVC (Draft 8), ALF filter parameters are signalled in adaptation parameter set (APS). In one APS, up to 25 sets of luma filter coefficients and clipping value indexes, and up to eight sets of chroma filter coefficients and clipping value indexes could be signalled. To reduce bits overhead, filter coefficients of different classification for luma component can be merged. In slice header, the indices of the APSs used for the current slice are signaled. The signaling of ALF is CTU-based in VVC (Draft 8).

Clipping value indexes, which are decoded from the APS, allow determining clipping values using a table of clipping values for Luma and Chroma. These clipping values are dependent of the internal bitdepth. More precisely, the table of clipping values is obtained by the following formula:

$$\text{AlfClip} = \{\text{round}(2^{B-\alpha*n}) \text{ for } n \in [0 \ldots N-1]\} \quad \text{(Eq. 12)}$$

with B equal to the internal bitdepth, α is a pre-defined constant value equal to 2.35, and N equal to 4 which is the number of allowed clipping values in VVC (Draft 8).

Table 2 shows the output of equation 12.

TABLE 2

Specification AlfClip depending on bitDepth and clipIdx

| | clipIdx | | | |
|---|---|---|---|---|
| bitDepth | 0 | 1 | 2 | 3 |
| 8 | 255 | 50 | 10 | 2 |
| 9 | 511 | 100 | 20 | 4 |
| 10 | 1023 | 201 | 39 | 8 |
| 11 | 2047 | 402 | 79 | 15 |
| 12 | 4095 | 803 | 158 | 31 |
| 13 | 8191 | 1607 | 315 | 62 |
| 14 | 16383 | 3214 | 630 | 124 |
| 15 | 32767 | 6427 | 1261 | 247 |
| 16 | 65535 | 12855 | 2521 | 495 |

In slice header, up to 7 APS indices can be signaled to specify the luma filter sets that are used for the current slice. The filtering process can be further controlled at coding tree block (CTB) level. A flag is always signalled to indicate whether ALF is applied to a luma CTB. A luma CTB can choose a filter set among 16 fixed filter sets and the filter sets from APSs. A filter set index is signaled for a luma CTB to indicate which filter set is applied. The 16 fixed filter sets are pre-defined and hardcoded in both the encoder and the decoder.

For chroma component, an APS index is signaled in slice header to indicate the chroma filter sets being used for the current slice. At CTB level, a filter index is signaled for each chroma CTB if there is more than one chroma filter set in the APS.

The filter coefficients may be quantized with norm equal to 128. In order to restrict the multiplication complexity, a bitstream conformance is applied so that the coefficient value of the non-central position shall be in the range of −2⁷ to 2⁷−1, inclusive. The central position coefficient is not signalled in the bitstream and is considered as equal to 128.

In VVC (Draft 8), the syntaxes and semantics of clipping index and values are defined as follows: alf_luma_clip_idx[sfIdx][j] specifies the clipping index of the clipping value to use before multiplying by the j-th coefficient of the signalled luma filter indicated by sfIdx. It is a requirement of bitstream conformance that the values of alf_luma_clip_idx[sfIdx][j] with sfIdx=0 . . . alf_luma_num_filters_signalled_minus1 and j=0 . . . 11 shall be in the range of 0 to 3, inclusive.

The luma filter clipping values AlfClipL[adaptation_parameter_set_id] with elements AlfClipL[adaptation_parameter_set_id][filtIdx][j], with filtIdx=0 . . . NumAlfFilters−1 and j=0 . . . 11 are derived as specified in Table 2 depending on bitDepth set equal to BitDepthY and clipIdx set equal to alf_luma_clip_idx[alf_luma_coeff_delta_idx[filtIdx] ][j].

alf_chroma_clip_idx[altIdx][j] specifies the clipping index of the clipping value to use before multiplying by the j-th coefficient of the alternative chroma filter with index altIdx. It is a requirement of bitstream conformance that the values of alf_chroma_clip_idx[altIdx][j] with altIdx=0 . . . alf_chroma_num_alt_filters_minus1, j=0 . . . 5 shall be in the range of 0 to 3, inclusive.

The chroma filter clipping values AlfClipC[adaptation_parameter_set_id][altIdx] with elements AlfClipC[adaptation_parameter_set_id][altIdx][j], with altIdx=0 . . . alf_chroma_num_alt_filters_minus1, j=0 . . . 5 are derived as specified in Table 2 depending on bitDepth set equal to BitDepthC and clipIdx set equal to alf_chroma_clip_idx[altIdx][j].

1.5 Filtering Process

At decoder side, when ALF is enabled for a CTB, each sample R(i,j) within the CU is filtered, resulting in sample value R'(i,j) as shown below, $$R'(i,j) = R(i,j) + ((\Sigma_{k \neq 0} \Sigma_{l \neq 0} f(k,l) \times K(R(i+k,j+l) - R(i,j), c(k,l)) + 64) >> 7) \quad \text{(Eq. 13)}$$

where f(k,l) denotes the decoded filter coefficients, K(x,y) is the clipping function and c(k,l) denotes the decoded clipping parameters. The variable k and l vary between $$-\frac{L}{2} \text{ and } \frac{L}{2}$$

where L denotes the filter length. The clipping function K(x,y)=min(y, max(−y, x)) which corresponds to the function Clip3 (−y, y, x). By incorporating this clipping function, this loop filtering method becomes a non-linear process, known as Non-Linear ALF. The selected clipping values are coded in the "alf_data" syntax element by using a Golomb encoding scheme corresponding to the index of the clipping value in Table 2. This encoding scheme is the same as the encoding scheme for the filter index.

1.6 Virtual Boundary Filtering Process for Line Buffer Reduction

To reduce the line buffer requirement of ALF, modified block classification and filtering are employed for the samples near horizontal CTU boundaries. For this purpose, a virtual boundary may be defined as a line by shifting the horizontal CTU boundary with "N" samples as shown in FIG. 4, with N equal to 4 for the Luma component and 2 for the Chroma component.

Figure 4:
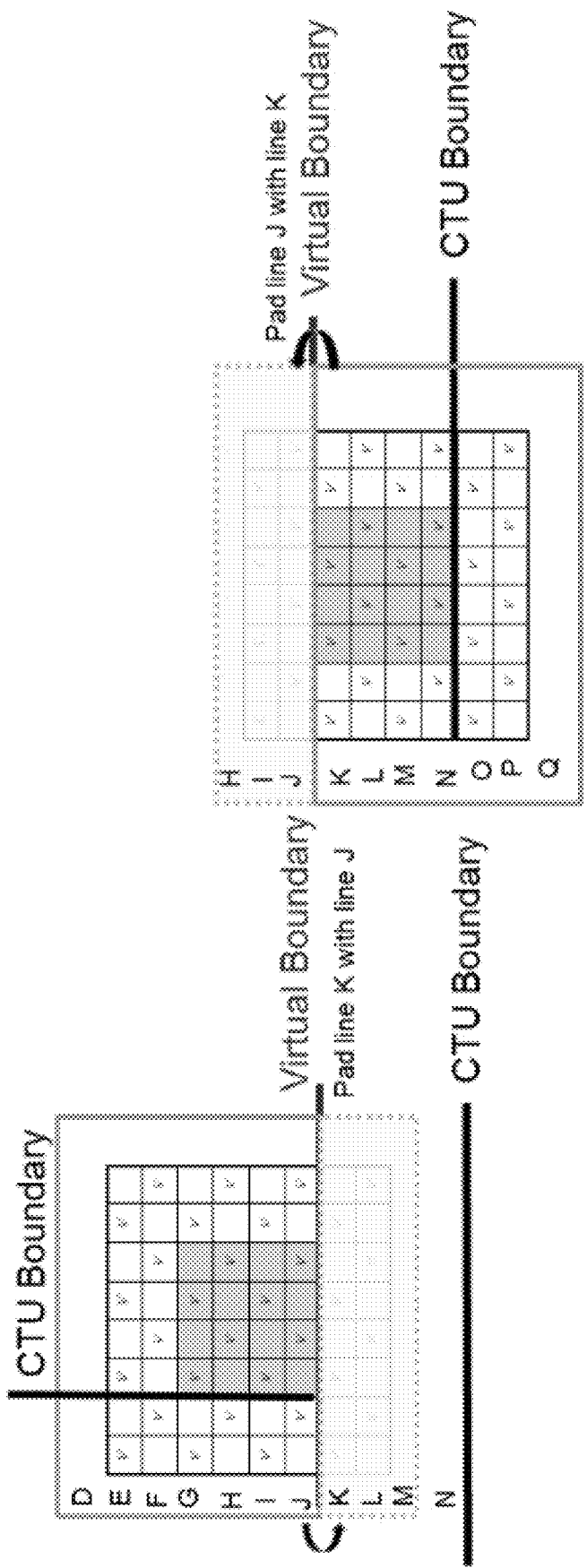
FIG. 4 illustrates a modified block classification at virtual boundaries.

Modified block classification is applied for the Luma component as depicted in FIG. 4. For the 1D Laplacian gradient calculation of the 4×4 block above the virtual boundary, only the samples above the virtual boundary are used. Similarly, for the 1D Laplacian gradient calculation of the 4×4 block below the virtual boundary, only the samples below the virtual boundary are used. The quantization of activity value A is accordingly scaled by taking into account the reduced number of samples used in 1D Laplacian gradient calculation.

Figure 5:
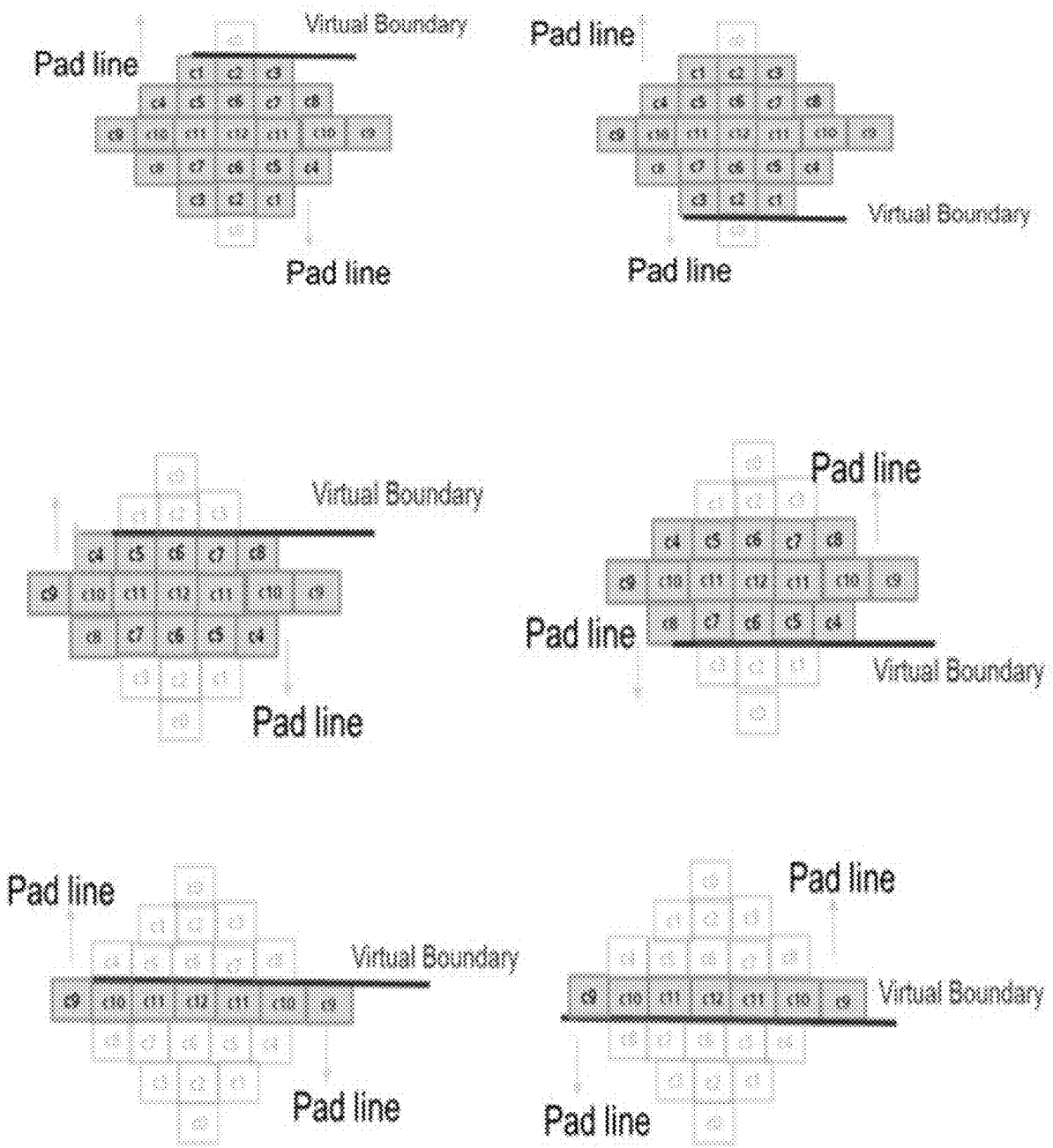
FIG. 5 illustrates a modified ALF filtering for luma component at virtual boundaries.

For filtering processing, symmetric padding operation at the virtual boundaries are used for both Luma and Chroma components. As shown in FIG. 5 ("Modified ALF filtering for Luma component at virtual boundaries), when the sample being filtered is located below the virtual boundary, the neighboring samples that are located above the virtual boundary are padded. Meanwhile, the corresponding samples at the other sides are also padded, symmetrically.

1.7 Largest Coding Unit (LCU)-Aligned Picture Quadtree Splitting

In order enhance coding efficiency, the coding unit synchronous picture quadtree-based adaptive loop filter is proposed in JCTVC-C143 [3]. The luma picture is split into several multi-level quadtree partitions, and each partition boundary is aligned to the boundaries of the largest coding units (LCUs). Each partition has its own filtering process and thus be called as a filter unit (FU).

The 2-pass encoding flow is described as follows. At the first pass, the quadtree split pattern and the best filter of each FU are decided. The filtering distortions are estimated by FFDE during the decision process. According to the decided quadtree split pattern and the selected filters of all FUs, the reconstructed picture is filtered. At the second pass, the CU synchronous ALF on/off control is performed. According to the ALF on/off results, the first filtered picture is partially recovered by the reconstructed picture.

A top-down splitting strategy is adopted to divide a picture into multi-level quadtree partitions by using a rate-distortion criterion. Each partition is called a filter unit. The splitting process aligns quadtree partitions with LCU boundaries. The encoding order of FUs follows the z-scan order. For example, the picture may be split into 10 FUs, and the encoding order is FU0, FU1, FU2, FU3, FU4, FU5, FU6, FU7, FU8, and FU9.

To indicate the picture quadtree split pattern, split flags may be encoded and transmitted in z-order.

The filter of each FU may be selected from two filter sets based on the rate-distortion criterion. The first set may have ½-symmetric square-shaped and rhombus-shaped filters newly derived for the current FU. The second set may come from time-delayed filter buffers; the time-delayed filter buffers store the filters previously derived for FUs of prior pictures. The filter with the minimum rate-distortion cost of these two sets may be chosen for the current FU. Similarly, if the current FU is not the smallest FU and can be further split into 4 children FUs, the rate-distortion costs of the 4 children FUs are calculated. By comparing the rate-distortion cost of the split and non-split cases recursively, the picture quadtree split pattern can be decided.

The maximum quadtree split level is 2 in JCTVC-C143, which means the maximum number of FUs is 16. During the quadtree split decision, the correlation values for deriving Wiener coefficients of the 16 FUs at the bottom quadtree level (smallest FUs) can be reused. The rest FUs can derive their Wiener filters from the correlations of the 16FUs at the bottom quadtree level. Therefore, there is only one frame buffer access for deriving the filter coefficients of all FUs.

After the quadtree split pattern is decided, to further reduce the filtering distortion, the CU synchronous ALF on/off control is performed. By comparing the filtering distortion and non-filtering distortion, the leaf CU can explicitly switch ALF on/off in its local region. The coding efficiency may be further improved by redesigning the filter coefficients according to the ALF on/off results. However, the redesigning process needs additional frame buffer accesses. In the proposed CS-PQALF encoder design, there is no redesign process after the CU synchronous ALF on/off decision in order to minimize the number of frame buffer accesses.

2. Cross-Component Adaptive Loop Filter

Cross-component adaptive loop filter (CC-ALF) makes use of luma sample values to refine each chroma component.

CC-ALF operates by applying a linear, diamond shaped filter to the luma channel for each chroma component. The filter coefficients are transmitted in the APS, scaled by a factor of $2^{10}$, and rounded for fixed point representation. The application of the filters is controlled on a variable block size and signalled by a context-coded flag received for each block of samples. The block size along with an CC-ALF enabling flag is received at the slice-level for each chroma component. In the contribution the following block sizes (in chroma samples) were supported 16×16, 32×32, 64×64.

Syntax changes of CC-ALF are described below in Table 3.

TABLE 3

```
        if ( slice_cross_component_alf_cb_enabled_flag )
            alf_ctb_cross_component_cb_idc[ xCtb >> CtbLog2SizeY ][ yCtb >> CtbL      ae(v)
  og2SizeY ]
            if( slice_cross_component_alf_cb_enabled_flag = = 0 || alf_ctb_cross_compo
  nent_cb_idc[ xCtb >> CtbLog2SizeY ][ yCtb >> CtbLog2SizeY ] == 0 )
                if( slice_alf_chroma_idc = = 1 | | slice_alf_chroma_idc = = 3 ) {
                    alf_ctb_flag[ 1 ][ xCtb >> CtbLog2SizeY ][ yCtb >> CtbLog2SizeY ]    ae(v)
                    if( alf_ctb_flag[ 1 ][ xCtb >> CtbLog2SizeY ][ yCtb >> CtbLog2SizeY ]
                        && aps_alf_chroma_num_alt_filters_minus1 > 0 )
            alf_ctb_filter_alt_idx[ 0 ][ xCtb >> CtbLog2SizeY ][ yCtb >> CtbLog2Size    ae(v)
  Y ]
                }
            if ( slice_cross_component_alf_cr_enabled_flag )
                alf_ctb_cross_component_cr_idc[ xCtb >> CtbLog2SizeY ][ yCtb >> CtbL    ae(v)
  og2SizeY ]
```

TABLE 3-continued

```
    if( slice_cross_component_alf_cr_enabled_flag = = 0 || alf_ctb_cross_compo
nent_cr_idc[ xCtb >> CtbLog2SizeY ][ yCtb >> CtbLog2SizeY ] == 0 )
        if( slice_alf_chroma_idc = = 2 | | slice_alf_chroma_idc = = 3 ) {
            alf_ctb_flag[ 2 ][ xCtb >> CtbLog2SizeY ][ yCtb >> CtbLog2SizeY ]      ae(v)
            if( alf_ctb_flag[ 2 ][ xCtb >> CtbLog2SizeY ][ yCtb >> CtbLog2SizeY ]
                && aps_alf_chroma_num_alt_filters_minus1 > 0 )
        alf_ctb_filter_alt_idx[ 1 ][ xCtb >> CtbLog2SizeY ][ yCtb >> CtbLog2Size    ae(v)
Y ]
        }
```

The semantics of CC-ALF related syntaxes are described below:

alf_ctb_cross_component_cb_idc [xCtb>>CtbLog2SizeY][yCtb>>CtbLog2Size Y] equal to 0 indicates that the cross component Cb filter is not applied to block of Cb colour component samples at luma location (xCtb, yCtb).

alf_cross_component_cb_idc[xCtb>>CtbLog2SizeY] [yCtb>>CtbLog2SizeY] not equal to 0 indicates that the alf_cross_component_cb_idc[xCtb>>CtbLog2SizeY] [yCtb>>CtbLog2SizeY]-th cross component Cb filter is applied to the block of Cb colour component samples at luma location (xCtb, yCtb)

alf_ctb_cross_component_cr_idc [xCtb>>CtbLog2SizeY][yCtb>>CtbLog2Size Y] equal to 0 indicates that the cross component Cr filter is not applied to block of Cr colour component samples at luma location (xCtb, yCtb). alf_cross_component_cr_idc[xCtb>> CtbLog2SizeY][yCtb>>CtbLog2SizeY] not equal to 0 indicates that the alf_cross_component_cr_idc[xCtb>> CtbLog2SizeY][yCtb>>CtbLog2SizeY]-th cross component Cr filter is applied to the block of Cr colour component samples at luma location (xCtb, yCtb)

3 Chroma Sampling Formats

Figure 6:
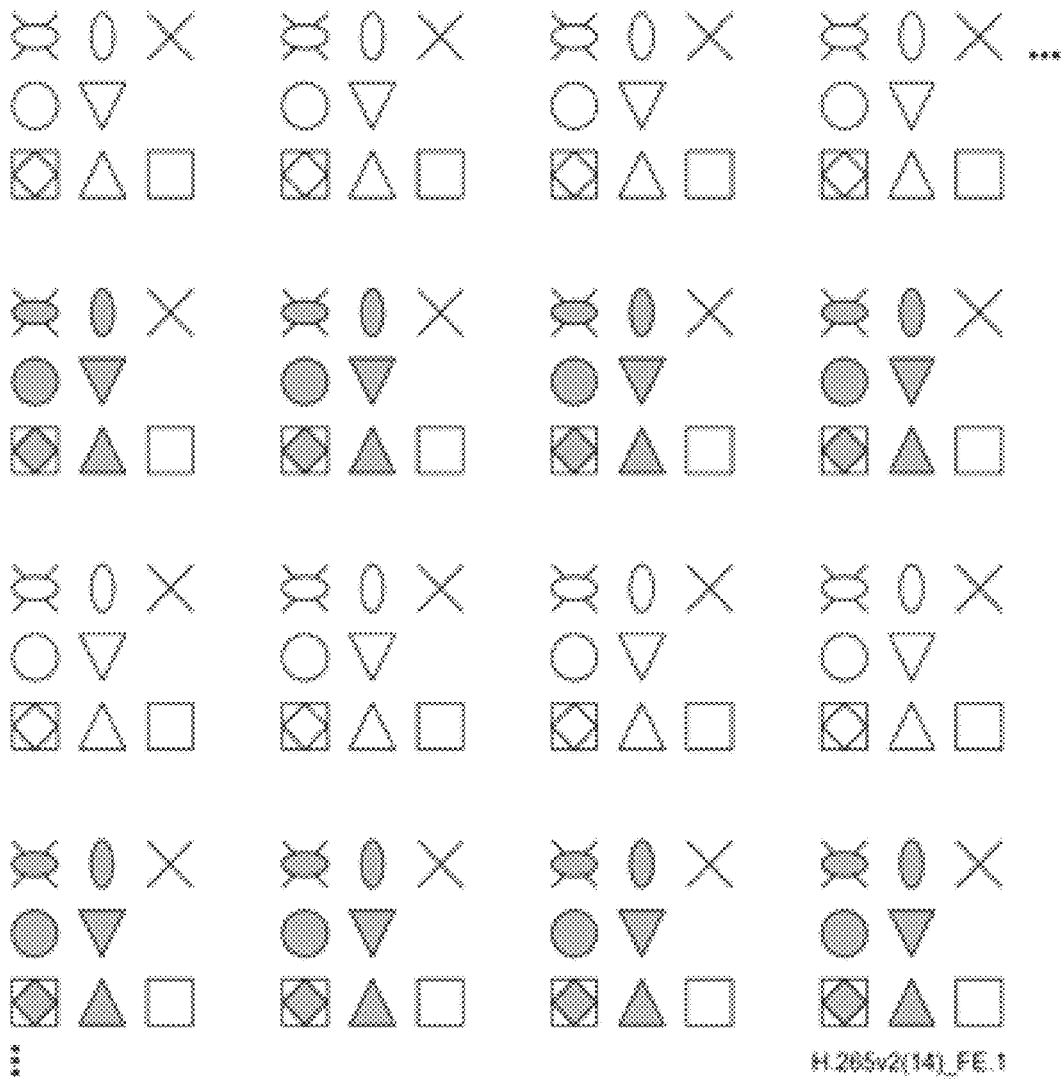
FIG. 6 illustrates a location of chroma samples relative to luma samples.

FIG. 6 ("Location of chroma samples relative to luma samples") of the present application illustrates the indicated relative position of the top-left chroma sample when chroma_format_idc is equal to 1 (4:2:0 chroma format), and chroma_sample_loc_type_top_field or chroma_sample_loc_type_bottom field is equal to the value of a variable ChromaLocType. The region represented by the top-left 4:2:0 chroma sample (depicted as a large red square with a large red dot at its centre) is shown relative to the region represented by the top-left luma sample (depicted as a small black square with a small black dot at its centre). The regions represented by neighbouring luma samples are depicted as small grey squares with small grey dots at their centres.

4 Constrained Directional Enhancement Filter

The main goal of the in-loop constrained directional enhancement filter (CDEF) is to filter out coding artifacts while retaining the details of the image. In HEVC, the Sample Adaptive Offset (SAO) algorithm achieves a similar goal by defining signal offsets for different classes of pixels. Unlike SAO, CDEF is a non-linear spatial filter. The design of the filter has been constrained to be easily vectorizable (i.e. implementable with SIMD operations), which was not the case for other non-linear filters like the median filter and the bilateral filter.

The CDEF design originates from the following observations. The amount of ringing artifacts in a coded image tends to be roughly proportional to the quantization step size. The amount of detail is a property of an input image, but the smallest detail retained in the quantized image tends to also be proportional to the quantization step size. For a given quantization step size, the amplitude of the ringing is generally less than the amplitude of the details.

CDEF works by identifying the direction of each block and then adaptively filtering along the identified direction and to a lesser degree along directions rotated 45 degrees from the identified direction. The filter strengths are signaled explicitly, which allows a high degree of control over the blurring. An efficient encoder search is designed for the filter strengths. CDEF is based on two previously proposed in-loop filters and the combined filter was adopted for the emerging AV1 codec.

4.1 Direction Search

Figure 7:
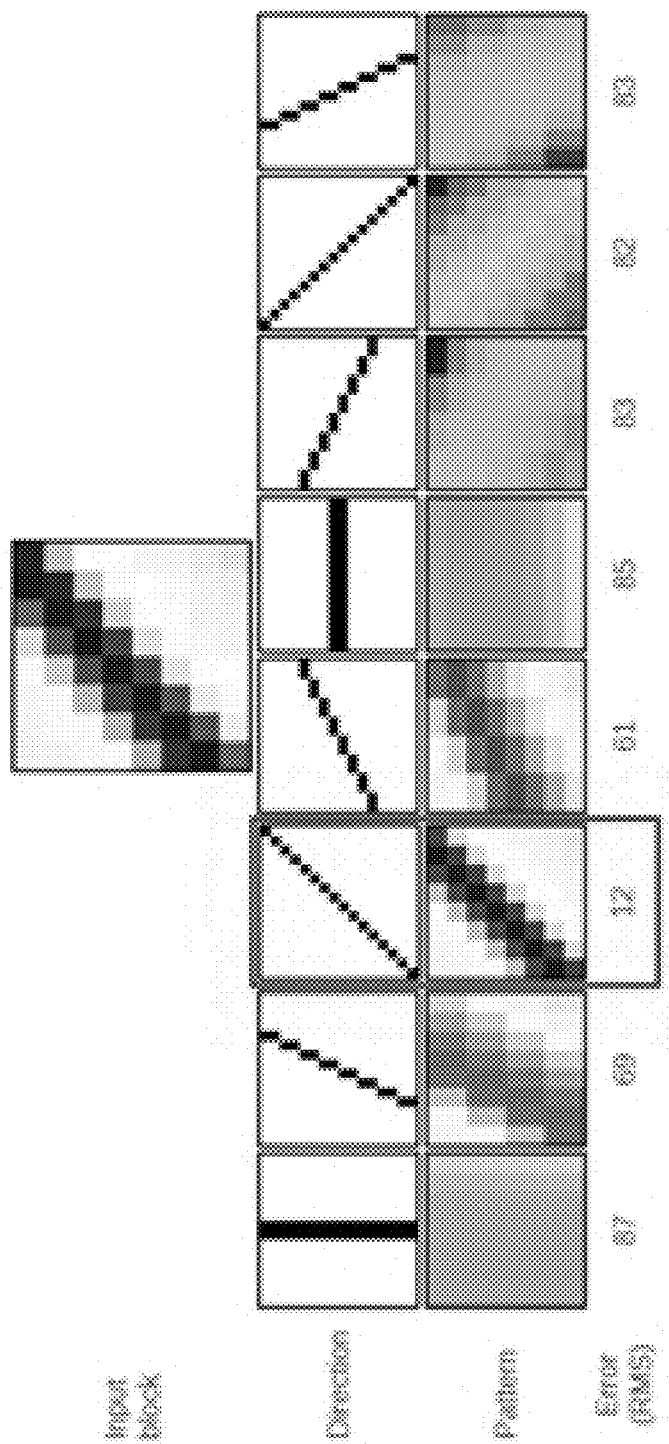
FIG. 7 illustrates an example of direction search for an 8×8 block.

The direction search operates on the reconstructed pixels, just after the deblocking filter. Since those pixels are available to the decoder, the directions require no signaling. The search operates on 8×8 blocks, which are small enough to adequately handle non-straight edges, while being large enough to reliably estimate directions when applied to a quantized image. Having a constant direction over an 8×8 region also makes vectorization of the filter easier. For each block we determine the direction that best matches the pattern in the block by minimizing the sum of squared differences (SSD) between the quantized block and the closest perfectly directional block. A perfectly directional block is a block where all of the pixels along a line in one direction have the same value. FIG. 7 is an example of direction search for an 8×8 block. In this case, the 45-degree direction (as shown by the box around column 12) is selected because it minimizes the error.

4.2 Non-linear low-pass directional filter

The main reason for identifying the direction is to align the filter taps along that direction to reduce ringing while preserving the directional edges or patterns. However, directional filtering alone sometimes cannot sufficiently reduce ringing. It is also desired to use filter taps on pixels that do not lie along the main direction. To reduce the risk of blurring, these extra taps are treated more conservatively. For this reason, CDEF defines primary taps and secondary taps. The complete 2-D CDEF filter is expressed as $$y(i, j) = x(i, j) + \text{round}\left(\sum_{m,n} w_{d,m,n}^{(p)} f(x(m, n) - x(i, j), S^{(p)}, D) + \sum_{m,n} w_{d,m,n}^{(s)} f(x(m, n) - x(i, j), S^{(s)}, D)\right), \quad \text{(Eq. 14)}$$

where D is the damping parameter, $S^{(p)}$ and $S^{(s)}$ are the strengths of the primary and secondary taps, respectively, and round(·) rounds ties away from zero, $w_k$ are the filter weights and f(d, S, D) is a constraint function operating on the difference between the filtered pixel and each of the neighboring pixels. For small differences, f(d, S, D)=d, making the filter behave like a linear filter. When the difference is large, f(d, S, D)=0, which effectively ignores the filter tap.

5. Loop Restoration in AV1

A set of in-loop restoration schemes are proposed for use in video coding post deblocking, to generally denoise and enhance the quality of edges, beyond the traditional deblocking operation. These schemes are switchable within a frame per suitably sized tile. The specific schemes described are based on separable symmetric Wiener filters and dual self-guided filters with subspace projection. Because content statistics can vary substantially within a frame, these tools are integrated within a switchable framework where different tools can be triggered in different regions of the frame.

5.1 Separable Symmetric Wiener Filter

One restoration tool that has been shown to be promising in the literature is the Wiener filter. Every pixel in a degraded frame could be reconstructed as a non-causal filtered version of the pixels within a w×w window around it where w=2r+1 is odd for integer r. If the 2D filter taps are denoted by a $w^2 \times 1$ element vector F in column-vectorized form, a straightforward LMMSE optimization leads to filter parameters being given by $F=H^{-1} M$, where $H=E[XX^T]$ is the autocovariance of x, the column-vectorized version of the $w^2$ samples in the w×w window around a pixel, and $M=E[YX^T]$ is the cross correlation of x with the scalar source sample y, to be estimated. The encoder can estimate H and M from realizations in the deblocked frame and the source and send the resultant filter F to the decoder. However, that would not only incur a substantial bit rate cost in transmitting $w^2$ taps, but also non-separable filtering will make decoding prohibitively complex. Therefore, several additional constraints are imposed on the nature of F. First, F is constrained to be separable so that the filtering can be implemented as separable horizontal and vertical w-tap convolutions. Second, each of the horizontal and vertical filters are constrained to be symmetric. Third, the sum of both the horizontal and vertical filter coefficients is assumed to sum to 1.

5.2 Dual Self-Guided Filtering with Subspace Projection

Guided filtering is one of the more recent paradigms of image filtering where a local linear model:

$$y=Fx+G \quad \text{(Eq. 15)}$$

is used to compute the filtered output y from an unfiltered sample x, where F and G are determined based on the statistics of the degraded image and a guidance image in the neighborhood of the filtered pixel. If the guide image is the same as the degraded image, the resultant so-called self-guided filtering has the effect of edge preserving smoothing. The specific form of self-guided filtering we propose depends on two parameters: a radius r and a noise parameter e, and is enumerated as follows:

1. Obtain mean $\mu$ and variance $\sigma^2$ of pixels in a (2r+1)×(2r+1) window around every pixel. This can be implemented efficiently with box filtering based on integral imaging.
2. Compute for every pixel: $f=\sigma^2/(\sigma^2+e)$; $g=(1-f)\mu$
3. Compute F and G for every pixel as averages off and g values in a 3×3 window around the pixel for use.

Filtering is controlled by r and e, where a higher r implies a higher spatial variance and a higher e implies a higher range variance.

Figure 8:
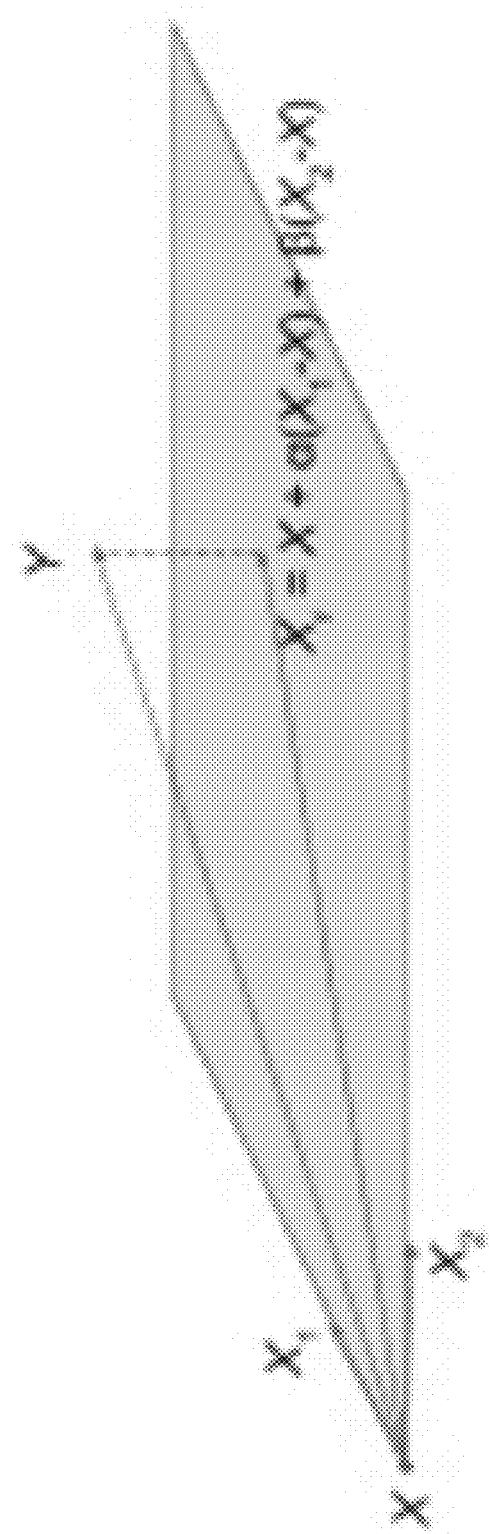
FIG. 8 illustrates an example of direction search for an 8×8 block.

The principle of subspace projection is illustrated diagrammatically in FIG. 8. Even though none of the cheap restorations $X_1$, $X_2$ are close to the source Y, appropriate multipliers $\{\alpha, \beta\}$ can bring them much closer to the source as long as they are moving somewhat in the right direction.

FIG. 8 shows a subspace projection using cheap restorations to produce a final restoration closer to the source.

6. Semi Decoupled Partitioning

A semi decoupled partitioning (SDP) scheme, or a semi separate tree (SST) or flexible block partitioning for chroma component. In this method, luma and chroma block in one super block (SB) may have same or different block partitioning, which is dependent on the luma coded block sizes or the luma tree depth. To be specific, when the luma block area size is greater than one threshold T1 or coding tree splitting depth of luma block is smaller than or equal to one threshold T2, then chroma block uses the same coding tree structure as luma. Otherwise when the block area size is smaller than or equal to T1 or luma splitting depth is larger than T2, the corresponding chroma block can have different coding block partitioning with luma component, which is called flexible block partitioning for chroma component. T1 is a positive integer, such as 128 or 256. T2 is a positive integer, such as 1 or 2.

Figure 9:
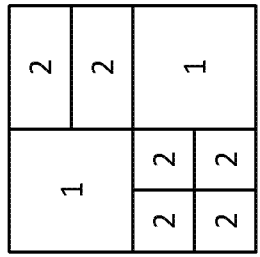
FIG. 9 illustrates an example of coding tree structures (luma and chroma)
Figure 9:
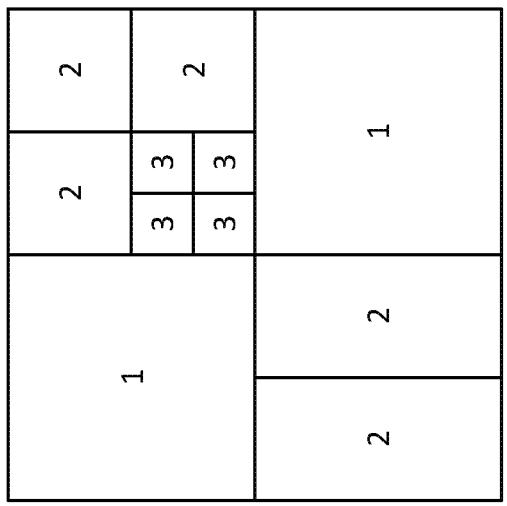

An improved semi decoupled partitioning (SDP) scheme was proposed, wherein luma and chroma component may share the partial tree structure from the root node of the super block, and the condition on when luma and chroma start separate tree partitioning depends on partitioning information of luma. For example, FIG. 9 shows an example of the coding tree structure for luma and chroma component.

In Constrained Directional Enhancement Filter (CDEF), luma and chroma components are limited to share presets at picture level. Additionally, luma and chroma components are also limited to have the same preset index at block level. Lastly, when deriving the filter strength of chroma component, luma block size is used to determine an input of chroma component. These constraints may limit the coding efficiency of CDEF.

In traditional CDEF, one preset contains luma and chroma primary/secondary strength. The number of allowed/available presets are signaled at picture level. At coded block level, an index is signaled to indicate which preset is selected for current block. Coded block sizes of CDEF include 128×128, 128×64, 64×64, and 64×128. There are three limitations of traditional CDEF: one limitation is that luma and chroma components are forced to share presets at picture level; another limitation is that luma and chroma components are forced to pick the same preset index at block level; one more limitation is that when deriving the filter strength of chroma component, luma block size is used to determine an input of chroma component. The aforementioned limitations together may limit the performance of CDEF, especially under the situation when luma and chroma components have different partitioning scheme, such as the partitioning scheme in semi decoupled partitioning (SDP).

In this document, a Separate Constrained Directional Enhancement Filter (SCDEF) is proposed which performs the CDEF process of luma and chroma components separately. Compared with traditional CDEF, SCDEF allows the filtering of luma and chroma components independent from each other. To be more specific, luma and chroma components may have different number of presets at picture level; Moreover, luma and chroma components may select different preset index at block level; When deriving the filter strength of chroma component, chroma block size is used to determine an input of chroma component.

Figure 12:
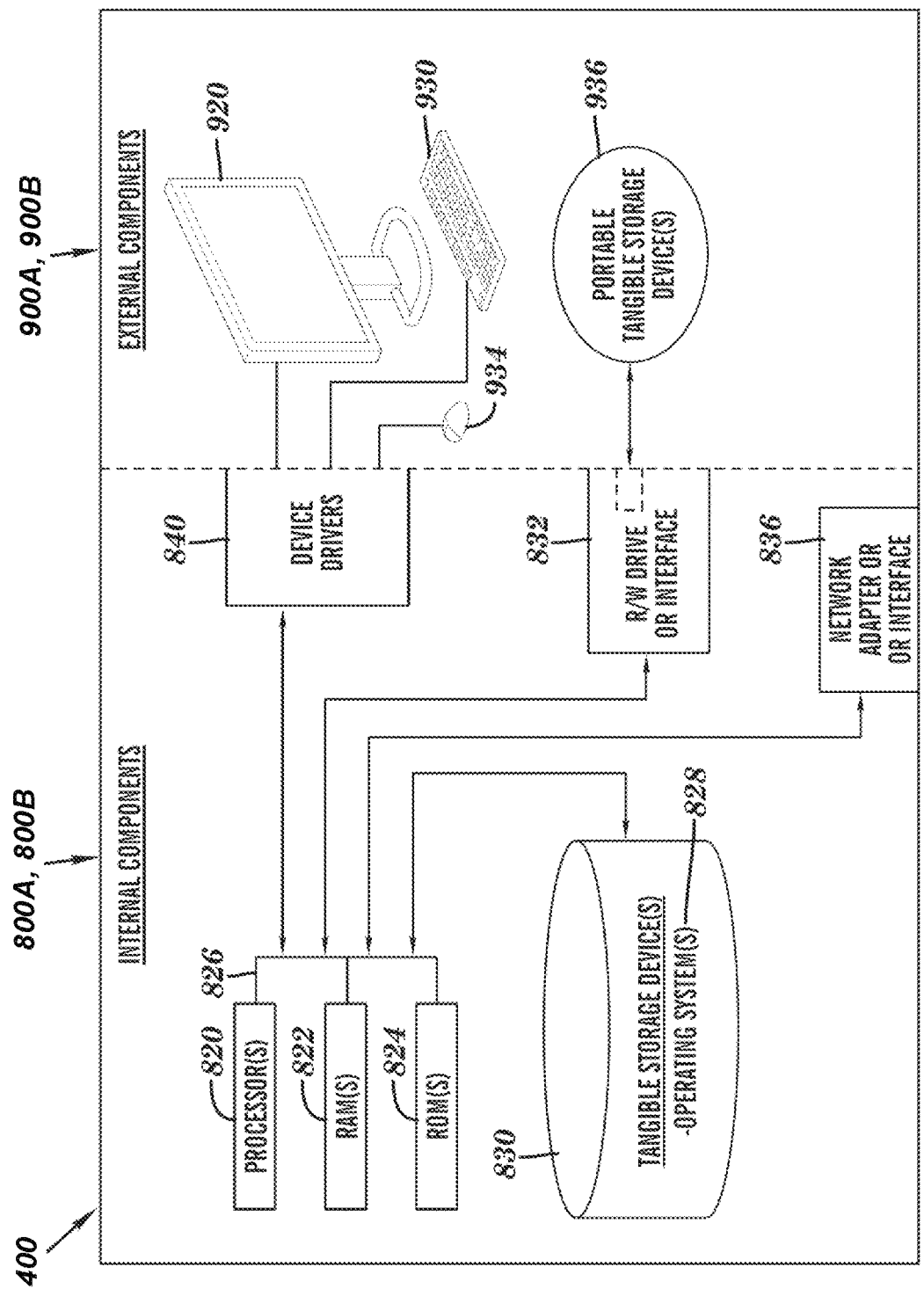
FIG. 12 is a block diagram of internal and external components of computers and servers depicted in FIG. 1 according to at least one embodiment.

It is proposed that when luma and chroma components have different partitioning or semi-decoupled partitioning, CDEF filtering process of luma and chroma components are performed separately, as shown in FIG. 12. An input of the CDEF filtering process is the reconstructed samples of luma/chroma components. The intermediate output of this process includes but not limited to the derived filter presets and per-block level preset index as mentioned in the above proposed method. The eventual output of this process is the filtered reconstructed samples of luma/chroma components.

In one embodiment, the number of presets derived for luma and chroma component may be different from each other at picture level. An input of the CDEF filtering process is the reconstructed samples in luma/chroma component. The output of this process is the derived presets at picture level. Example number of presets at picture level include but not limited to 1, 2, 4, 8.

In one example, the number of presets derived and selected for current luma component in one frame is 2, and the number of presets derived and selected for current chroma component in this frame is 1.

In another example, the number of presets derived and selected for luma component is N, N is a positive integer, such as 1, 2, 4, or 8, whereas the number of presets for chroma component is fixed as 1. The number of presets for chroma component does not need to be signaled in the bitstream, and derived as 1 in the decoder.

Figure 10:
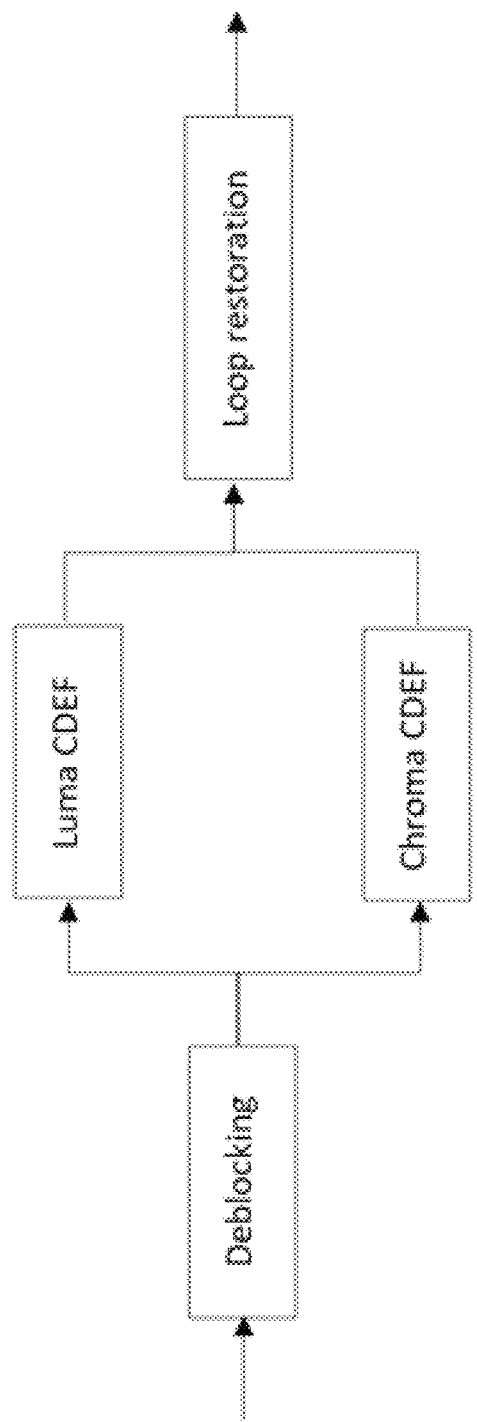
FIG. 10 illustrates a Separate Constrained Directional Enhancement Filter (SCDEF)

For example, FIG. 10 shows a Separate Constrained Directional Enhancement Filter (SCDEF).

In one embodiment, the selected preset index for current luma and chroma block may be different from each other. An input of this process is luma/chroma reconstructed samples of current block, and the presets derived and selected at frame level. The output of this process is an index indicating which preset is selected for current block.

In one example, when luma component has 8 presets and chroma component has 4 presets at frame level, the preset index selected for luma block A is 7, and the preset index selected for chroma block B is 1. Luma block A and chroma block B are co-located or partially co-located.

In one embodiment, when deriving the CDEF filtering strength of chroma component, an input reconstructed sample is determined by current chroma coded block size.

In one example, when current chroma block is of size 32×64, an input is chroma reconstructed sample values of current 32×64 block.

In one embodiment, when separate partitioning or semi de-coupled partitioning is applied to luma and chroma blocks, luma and chroma blocks still share the same preset index, and only the luma (or chroma) block size is employed in the preset index derivation/signaling process.

In some embodiments, when luma and chroma components have the same coded block size, the CDEF filtering process of luma and chroma components are performed separately.

In some embodiments, the signaling of SCDEF are performed separately for luma and chroma components.

In one embodiment, picture level presets are signaled separately for luma and chroma components. These presets can be signaled in high-level parameter set (DPS, VPS, SPS, PPS, APS), slice header, picture header, SEI message.

In one example, luma presets are signaled first, then, chroma presets are signaled.

In one embodiment, block level preset indexes are signaled separately for luma and chroma components.

In one example, preset indexes of luma component are signaled first, then, preset indexes of chroma component are signaled.

Figure 11:
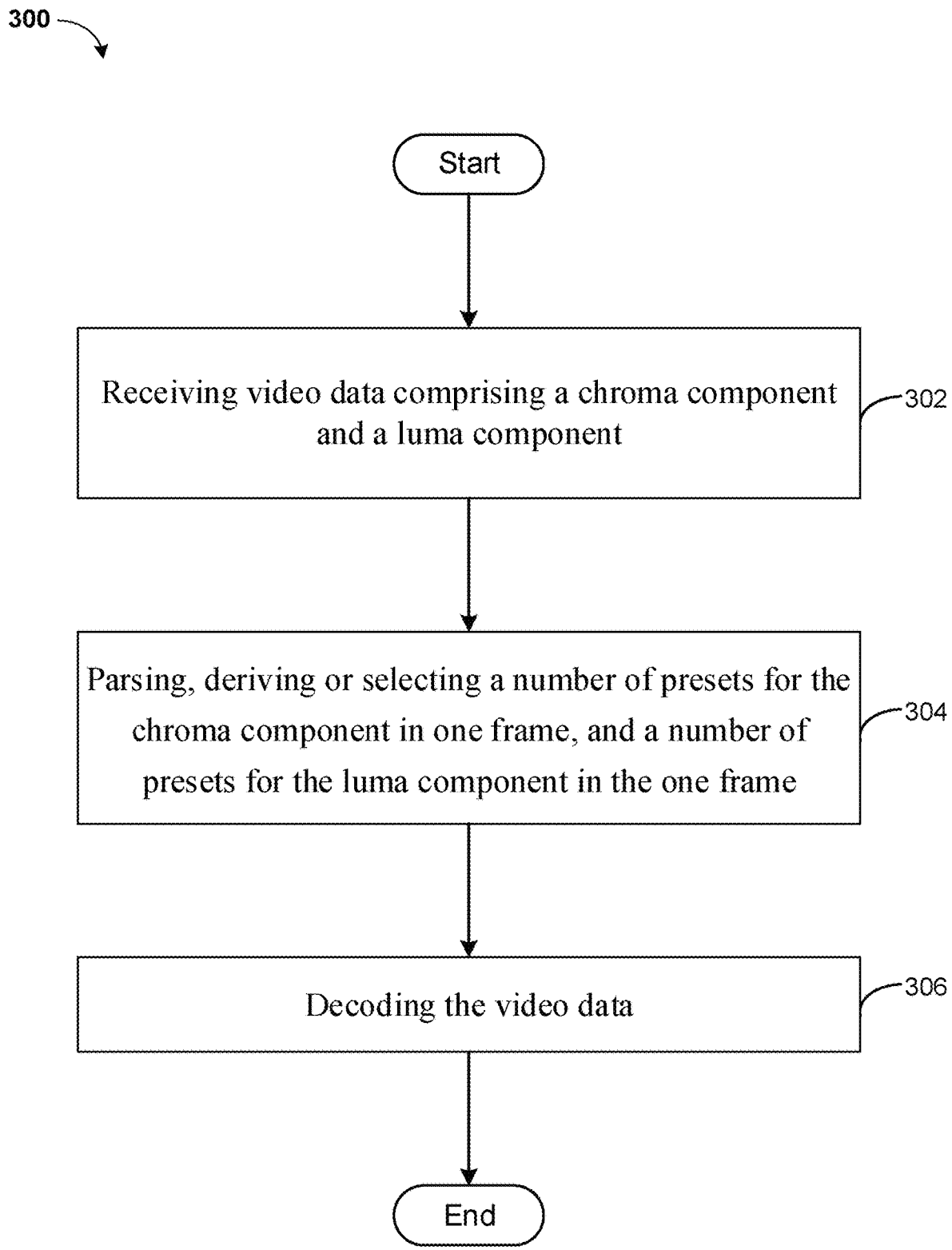
FIG. 11 is an operational flowchart illustrating the steps carried out by a program that codes video data, according to at least one embodiment.

Referring now to FIG. 11, an operational flowchart illustrating the steps of a method 300 for decoding video data is depicted. However, one of ordinary skill can appreciate how the encoding process would work based on FIG. 11. In some implementations, one or more process blocks of FIG. 3 may be performed by the computer 102 (FIG. 1) and the server computer 114 (FIG. 1). In some implementations, one or more process blocks of FIG. 3 may be performed by another device or a group of devices separate from or including the computer 102 and the server computer 114.

At 302, the method 300 includes receiving video data comprising a chroma component and a luma component.

At 304, the method 300 includes parsing, deriving or selecting a number of presets for the chroma component in one frame, and a number of presets for the luma component in the one frame.

At 306, the method 300 includes encoding and/or decoding the video data.

Operation 306 may be based on the number of presets for the chroma component in one frame, and the number of presets for the luma component in the one frame.

The method may further comprise: performing a separate Constrained Directional Enhancement Filter (CDEF) process of filtering luma and chroma components independent from each other based on the number of presets for the chroma component in one frame, and the number of presets for the luma component in the one frame.

It may be appreciated that FIG. 11 provides only an illustration of one implementation and does not imply any limitations with regard to how different embodiments may be implemented. Many modifications to the depicted environments may be made based on design and implementation requirements.

FIG. 12 is a block diagram 400 of internal and external components of computers depicted in FIG. 1 in accordance with an illustrative embodiment. It should be appreciated that FIG. 4 provides only an illustration of one implementation and does not imply any limitations with regard to the environments in which different embodiments may be implemented. Many modifications to the depicted environments may be made based on design and implementation requirements.

Computer 102 (FIG. 1) and server computer 114 (FIG. 1) may include respective sets of internal components 800A,B and external components 900A,B illustrated in FIG. 12. Each of the sets of internal components 800 include one or more processors 820, one or more computer-readable RAMs 822 and one or more computer-readable ROMs 824 on one or more buses 826, one or more operating systems 828, and one or more computer-readable tangible storage devices 830.

Processor 820 is implemented in hardware, firmware, or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Bus 826 includes a component that permits communication among the internal components 800A,B.

The one or more operating systems 828, the software program 108 (FIG. 1) and the Video Encoding Program 116 (FIG. 1) on server computer 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 12, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory, an optical disk, a magneto-optic disk, a solid state disk, a compact disc (CD), a digital versatile disc (DVD), a floppy disk, a cartridge, a magnetic tape, and/or another type of non-transitory computer-readable tangible storage device that can store a computer program and digital information.

Each set of internal components 800A,B also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the software program 108 (FIG. 1) and the Video Encoding Program 116 (FIG. 1) can be stored on one or more of the respective portable computer-readable tangible storage devices 936, read via the respective R/W drive or interface 832 and loaded into the respective hard drive 830.

Each set of internal components 800A,B also includes network adapters or interfaces 836 such as a TCP/IP adapter cards; wireless Wi-Fi interface cards; or 3G, 4G, or 5G wireless interface cards or other wired or wireless communication links. The software program 108 (FIG. 1) and the Video Encoding Program 116 (FIG. 1) on the server computer 114 (FIG. 1) can be downloaded to the computer 102 (FIG. 1) and server computer 114 from an external computer via a network (for example, the Internet, a local area network or other, wide area network) and respective network adapters or interfaces 836. From the network adapters or interfaces 836, the software program 108 and the Video Encoding Program 116 on the server computer 114 are loaded into the respective hard drive 830. The network may comprise copper wires, optical fibers, wireless transmission, routers, firewalls, switches, gateway computers and/or edge servers.

Each of the sets of external components 900A,B can include a computer display monitor 920, a keyboard 930, and a computer mouse 934. External components 900A,B can also include touch screens, virtual keyboards, touch pads, pointing devices, and other human interface devices. Each of the sets of internal components 800A,B also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, some embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 13:
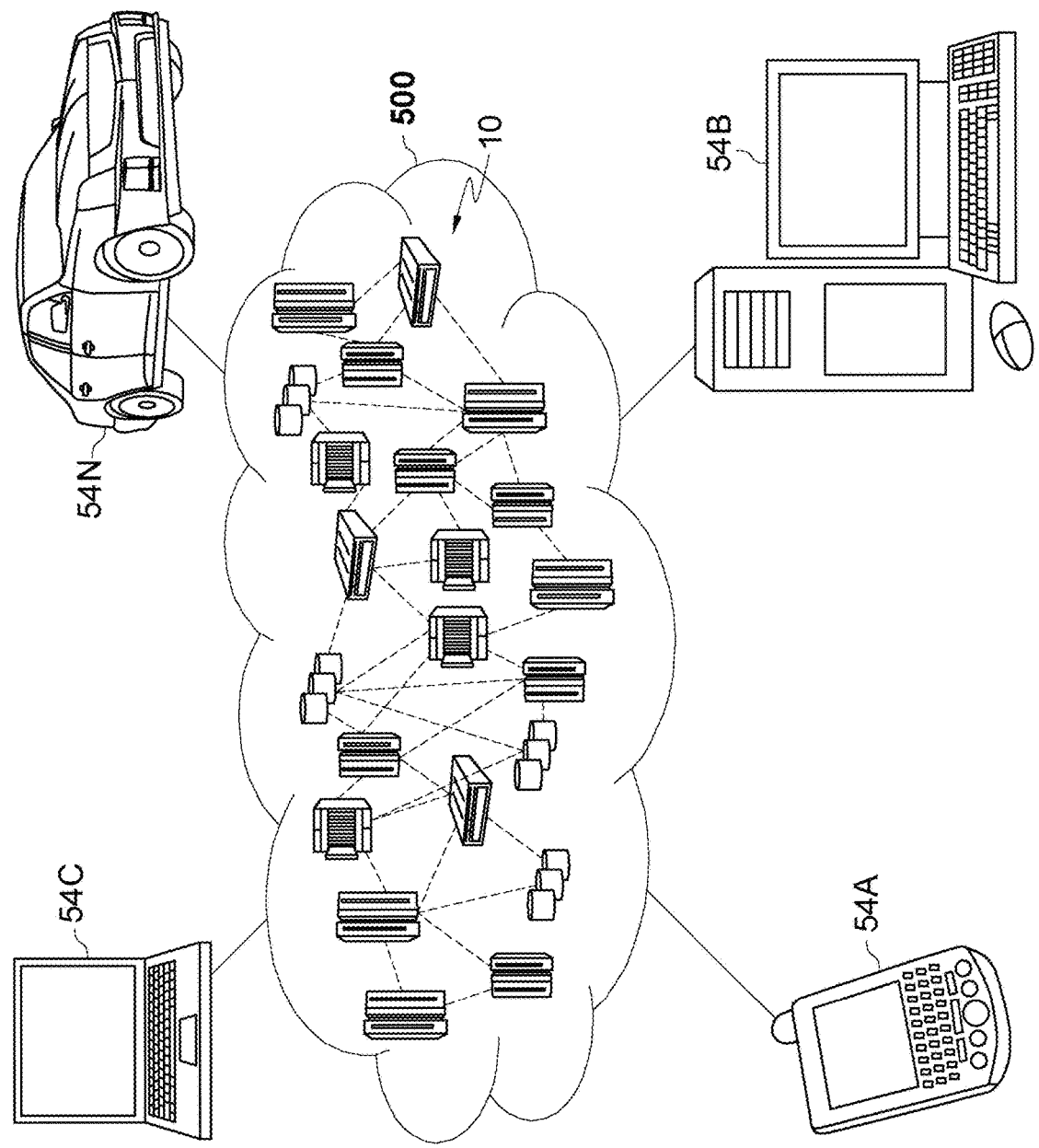
FIG. 13 is a block diagram of an illustrative cloud computing environment including the computer system depicted in FIG. 1, according to at least one embodiment.

Referring to FIG. 13, illustrative cloud computing environment 500 is depicted. As shown, cloud computing environment 500 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 54A-N shown in FIG. 13 are intended to be illustrative only and that cloud computing nodes 10 and cloud computing environment 500 can communicate with any type of computerized device over any type of network and/or network addressable connection (e.g., using a web browser).

Figure 14:
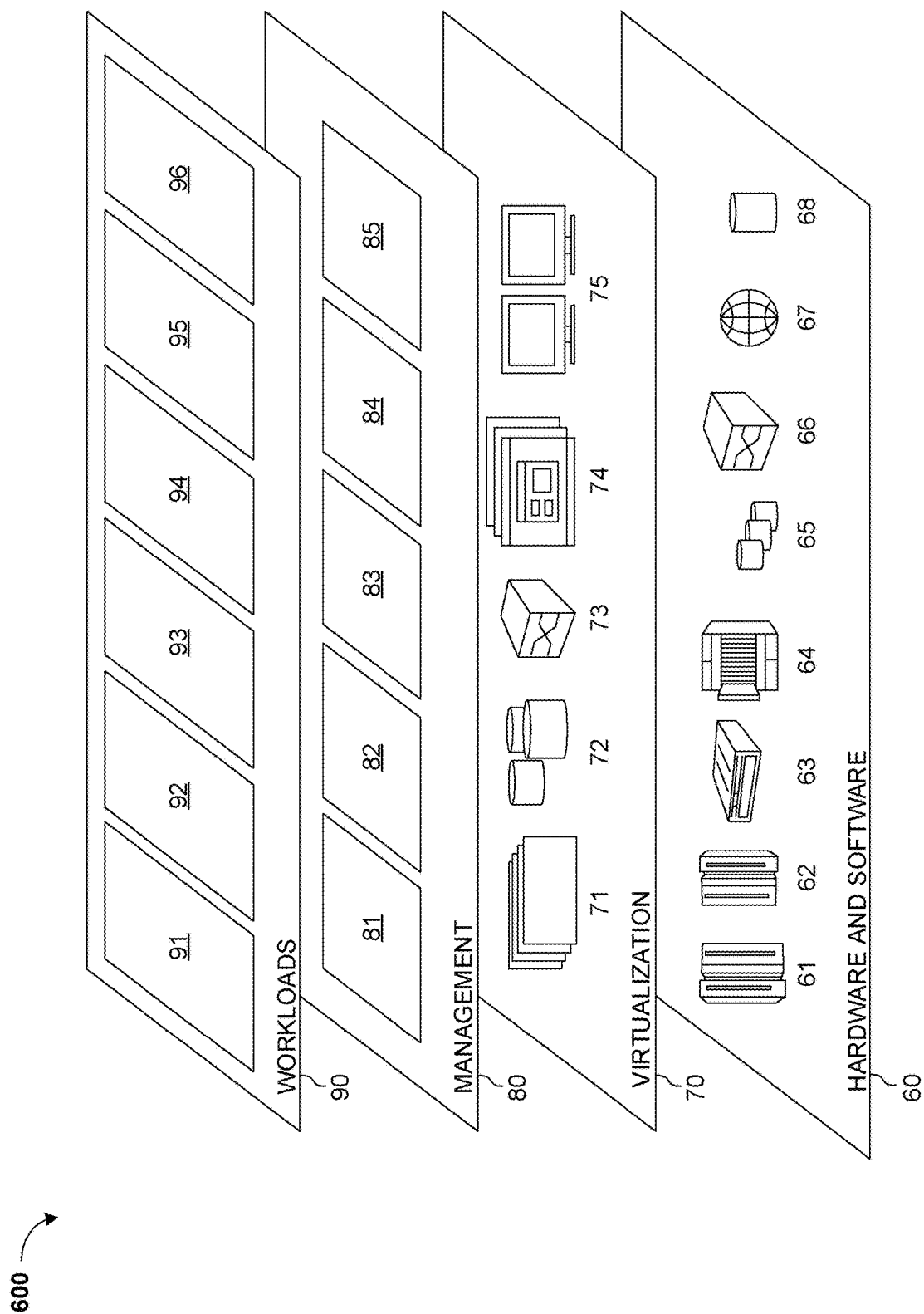
FIG. 14 is a block diagram of functional layers of the illustrative cloud computing environment of FIG. 13, according to at least one embodiment.

Referring to FIG. 14, a set of functional abstraction layers 600 provided by cloud computing environment 500 (FIG. 13) is shown. It should be understood in advance that the components, layers, and functions shown in FIG. 6 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Video Encoding/Decoding 96.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

Acronyms used throughout the disclosure include the following:
HEVC: High Efficiency Video Coding
HDR: high dynamic range
SDR: standard dynamic range
VVC: Versatile Video Coding
JVET: Joint Video Exploration Team
MPM: most probable mode
WAIP: Wide-Angle Intra Prediction
CU: Coding Unit
CTB: Coding Tree Block
PU: Prediction Unit
TU: Transform Unit
CTU: Coding Tree Unit
PDPC: Position Dependent Prediction Combination ISP: Intra Sub-Partitions
SPS: Sequence Parameter Setting
PPS: Picture Parameter Set
APS: Adaptation Parameter Set
VPS: Video Parameter Set
DPS: Decoding Parameter Set
ALF: Adaptive Loop Filter
SAO: Sample Adaptive Offset
CC-ALF: Cross-Component Adaptive Loop Filter
CDEF: Constrained Directional Enhancement Filter
LR: Loop Restoration Filter
AV1: AOMedia Video 1
AV2: AOMedia Video 2
SDP: Semi Decoupled Partitioning
SEI: Supplementary Enhancement Information

What is claimed is:

1. A method of video decoding, executable by a processor, the method comprising:
receiving video data comprising a chroma component and a luma component;
parsing, deriving or selecting a number of presets for the chroma component in one frame, and a number of presets for the luma component in the one frame;
decoding the video data; and
performing a first Constrained Directional Enhancement Filter (CDEF) process of filtering luma based on the number of presets for the luma component in the one frame, and performing a second CDEF process chroma components, which is separate and independent from the first CDEF process, based on the number of presets for the chroma component in the one frame,
wherein the number of presets for the luma component are different from the number of presets for the chroma component, wherein the number of presets derived for the luma component are different from the number of presets derived for the chroma component at picture level, and wherein the number of presets at picture level include one of: 1, 2, 4, or 8.

2. The method of claim 1, further comprising:
when luma and chroma components have different partitioning or semi-decoupled partitioning, performing the first and second CDEF processes of filtering luma and chroma components; and
obtaining an output of the first and second CDEF processes that includes filtered reconstructed samples of respective luma/chroma components, wherein
an input of the first and second CDEF processes is reconstructed samples of the respective luma/chroma components,
an intermediate output of the first and second CDEF processes includes derived filter presets and a per-block level preset index.

3. The method of claim 1, wherein the number of presets derived and selected for the luma component in the one frame is 2, and the number of presets derived and selected for the chroma component in the one frame is 1.

4. The method of claim 1, wherein the number of presets derived and selected for the luma component is N, which is a positive integer, and the number of presets for the chroma component is fixed as 1, which is derived as 1 in a decoder without signaling.

5. The method of claim 1, wherein
a selected preset index for a current luma block is different from a selected preset index for a current chroma block,
an input of the first and second CDEF processes is respective luma/chroma reconstructed samples of the current respective luma/chroma block(s), and the presets derived and selected at frame level, and
an output of the first and second CDEF processes is an index indicating which preset is selected for the current respective luma/chroma block(s).

6. The method of claim 1, further comprising:
when the number of presets for the luma component corresponds to 8 presets and the number of presets for the chroma component corresponds to 4 presets at frame level, selecting a preset index for a luma block A as 7, and selecting a preset index for a chroma block B as 1, wherein the luma block A and the chroma block B are co-located or partially co-located.

7. The method of claim 1, wherein,
when deriving a CDEF filtering strength of the chroma component, an input reconstructed sample is determined by current chroma coded block size.

8. The method of claim 7, wherein, when current chroma block is of a certain size, an input is chroma reconstructed sample values of a current block having the certain size.

9. The method of claim 1, wherein,
when separate partitioning or semi de-coupled partitioning is applied to the luma and chroma blocks, luma and chroma blocks still share the same preset index, and only one of the luma or chroma block size is employed in the preset index derivation.

10. The method of claim 1, wherein,
when luma and chroma components have the same coded block size, the CDEF filtering process of luma and chroma components are performed separately.

11. The method of claim 1, wherein picture level presets are signaled separately for the luma component and the chroma component in a high level parameter set, slice header, picture header, or a Supplementary Enhancement Information (SEI) message.

12. The method of claim 11, wherein luma presets are signaled first, and then chroma presets are signaled.

13. The method of claim 1, wherein block level preset indexes are signaled separately for luma and chroma components.

14. The method of claim 13, wherein preset indexes of the luma components are signaled first, and then preset indexes of the chroma component are signaled.

15. A computer system for decoding video data, the computer system comprising:
one or more computer-readable non-transitory storage media configured to store computer program code; and
one or more computer processors configured to access said computer program code and operate as instructed by said computer program code, said computer program code including:
receiving code configured to cause the one or more computer processors to receive video data comprising a chroma component and a luma component;
parsing, deriving or selecting code configured to cause the one or more computer processors to parse, derive or select a number of presets for the chroma component in one frame, and a number of presets for the luma component in the one frame;
decoding code configured to cause the one or more computer processors to decode the video data; and
performing code configured to cause the one or more computer processors to perform a first Constrained Directional Enhancement Filter (CDEF) process of filtering luma based on the number of presets for the luma component in the one frame, and perform a second CDEF process chroma components, which is separate and independent from the first CDEF process, based on the number of presets for the chroma component in the one frame, wherein the number of presets for the luma component are different from the number of presets for the chroma component, wherein the number of presets derived for the luma component are different from the number of presets derived for the chroma component at picture level, and wherein the number of presets at picture level include one of: 1, 2, 4, or 8.

16. A non-transitory computer readable medium having stored thereon a computer program for decoding video data, the computer program configured to cause one or more computer processors to:

receive video data comprising a chroma component and a luma component;

parse, derive or select code configured to cause the one or more computer processors to parse, derive or select a number of presets for the chroma component in one frame, and a number of presets for the luma component in the one frame;

decode code configured to cause the one or more computer processors to decode the video data; and perform a first Constrained Directional Enhancement Filter (CDEF) process of filtering luma based on the number of presets for the luma component in the one frame, and perform a second CDEF process chroma components, which is separate and independent from the first CDEF process, based on the number of presets for the chroma component in the one frame, wherein the number of presets for the luma component are different from the number of presets for the chroma component, wherein the number of presets derived for the luma component are different from the number of presets derived for the chroma component at picture level, and wherein the number of presets at picture level include one of: 1, 2, 4, or 8.

* * * * *